United States Patent [19]

Dickey

[11] 4,287,718
[45] Sep. 8, 1981

[54] CONDENSER VACUUM LOAD COMPENSATING SYSTEM

[75] Inventor: Jimmy R. Dickey, Jacksonville Beach, Fla.

[73] Assignee: Offshore Power Systems, Jacksonville, Fla.

[21] Appl. No.: 35,167

[22] Filed: May 2, 1979

Related U.S. Application Data

[62] Division of Ser. No. 856,064, Nov. 30, 1977, Pat. No. 4,206,013.

[51] Int. Cl.$^3$ .............................................. F01K 11/00
[52] U.S. Cl. ..................................... 60/687; 60/692
[58] Field of Search ................. 60/685, 686, 687, 690, 60/692; 165/47, 81

[56] References Cited

U.S. PATENT DOCUMENTS

| | | | |
|---|---|---|---|
| 1,781,107 | 11/1930 | Grace | 60/687 |
| 1,881,443 | 11/1932 | Flanders | 60/687 |
| 4,189,926 | 2/1980 | Hsu | 60/687 |
| 4,189,927 | 2/1980 | Gray | 60/687 |

Primary Examiner—Allen M. Ostrager
Assistant Examiner—Stephen F. Husar
Attorney, Agent, or Firm—Daniel C. Abeles

[57] ABSTRACT

A condenser arrangement having a load bearing member hermetically coupled to the condenser's condensation chamber. Load transfer means are adapted to transfer the condenser vacuum load acting on the load bearing member to the turbine or turbine support in a manner to balance the condenser vacuum load acting on the turbine through the turbine exhaust. In the preferred arrangement means are provided to minimize contributions from the condensate to forces acting upon the load bearing member.

6 Claims, 10 Drawing Figures

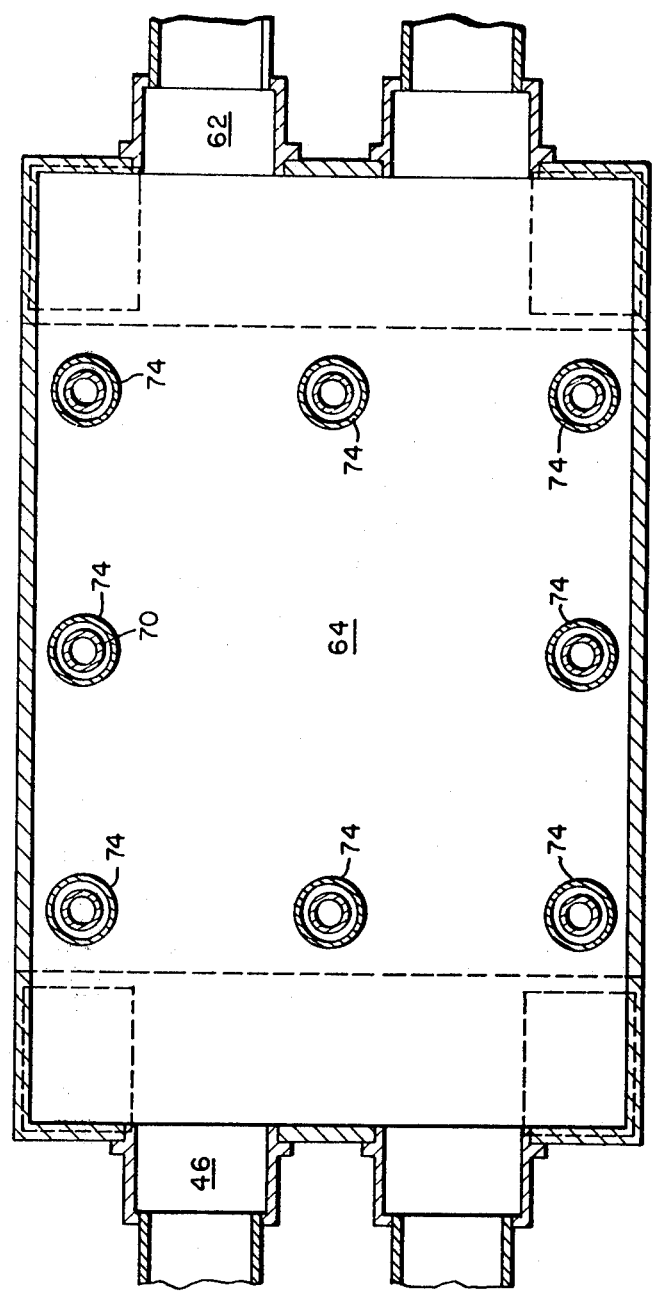

CONDENSER VACUUM LOAD COMPENSATING SYSTEM

This is a division of U.S. Pat. No. 4,206,013, issued June 3, 1980, now U.S. Pat. No. 4,206,013.

BACKGROUND OF THE INVENTION

This invention pertains generally to steam turbine condenser arrangements and more particularly to such arrangements that generate large vacuum loads which act upon the turbine support.

Basically a steam turbine system converts steam under pressure in a turbine to mechanical energy which is commonly employed to drive electrical generators. The steam exhausted from the turbine is usually communicated to a condenser where it is liquified and returned to the feedwater system of a steam generator to complete a closed loop cycle. Normally, the condenser and turbine are arranged in a multi-level facility with the condenser supported rigidly at a lower level below the turbine, which is independently supported. The turbine exhaust and condenser inlet are usually hermetically connected through an expandable coupling designed to accommodate thermal gradients and the relative movement of components. In operation, the change of state of steam within the condenser creates a large vacuum within the condensate chamber which can place large loads on the turbine housing and support. In large turbine facilities the vacuum loading may reach proportions which require turbine supports with increased load bearing capability to meet turbine deflection limitations. Such an increase in turbine support regidity provides a corresponding increase in weight and cost to the facility.

The foregoing condition can have a greater adverse effect in a turbine arrangement which employs a spring loaded support. The vacuum loading of the condenser in such an arrangement will result in excessive deflections for turbine operation.

One proposed modification to compensate for the vacuum load on the turbine support is to fixedly couple the turbine exhaust to the condenser inlet and mount the condenser on spring supports capable of accommodating thermal expansions and contractions experienced in operation. While this proposed solution may accommodate the vacuum load on a rigidly mounted turbine, it increases the potential for excessive movement in resilient systems, which is unacceptable in a floating barge mounted turbine facility, where the roll and pitch of the barge can further affect the movement of operating components.

Accordingly, a new type of condenser vacuum load compensating system is desired that will relieve the vacuum load on the turbine support without introducing additional flexibility into the turbine condenser arrangement.

SUMMARY OF THE INVENTION

Briefly, this invention overcomes the difficulties of the prior art by providing a condenser which is adapted to be rigidly supported, with a vacuum load compensating system which relieves the stress exerted on the turbine shaft supports attributable to the vacuum load generated in the condensation process.

The condenser is adapted to be rigidly supported at one end to a facility structural support and hermetically coupled at its inlet to the turbine exhaust through an expandable coupling. A load bearing member which forms a portion of the condenser structure is hermetically coupled to the interior of the condensation chamber. Force transmitting means are connected at one end to the load bearing member and are adapted to communicate forces acting on the load bearing member, due to the condensation of steam within the condensation chamber, to the turbine in a manner to balance the condenser vacuum load forces acting directly on the turbine.

In the preferred embodiment the condensate is isolated from the load bearing member so that it does not contribute to the balancing forces communicated through the force transmitting means. In a preferred application the condenser arrangement is employed in combination with a resiliently supported turbine as part of a floating barge facility.

BRIEF DESCRIPTION OF THE DRAWINGS

For a better understanding of the invention reference may be had to the preferred embodiment, exemplary of the invention, shown in the accompanying drawings, in which:

FIG. 8 is a cross-sectional view of the condenser arrangement of FIG. 6 taken along the lines A—A thereof;

DESCRIPTION OF THE PREFERRED EMBODIMENT

In a steam turbine system this invention substantially eliminates the condenser vacuum load acting upon the steam turbine supports. In accordance with this invention the condenser structure is modified to transmit the vacuum forces exerted upon the condensate chamber to the turbine in a manner to balance the vacuum forces acting directly upon the turbine. The result is a balanced operating load. The invention has particular applicability to arrangements employing resilient turbine supports and provides even greater benefit where relative motion of the components must be tolerated such as in barge mounted facilities as are presently planned for use in offshore nuclear power plants; as will be appreciated from the description provided hereafter.

The concept of offshore siting of nuclear power generating facilities has been considered for some time. The worsening trends in finding suitable land sites along the coast, power plant cost escalation and schedule delays, the growing concern of environmental impact of nuclear power generating stations and the desire for standardization to facilitate the licensing process have all lent impetus to a serious consideration of offshore siting. Presently, several such plants have been planned with attendant benefits which are particularly pointed out in several publications entitled "Offshore Nuclear Power Plants" appearing in *Nuclear Engineering Design* 25 (1973), 334-349 and *Nuclear Engineering International,* June 1973.

Figure 1:
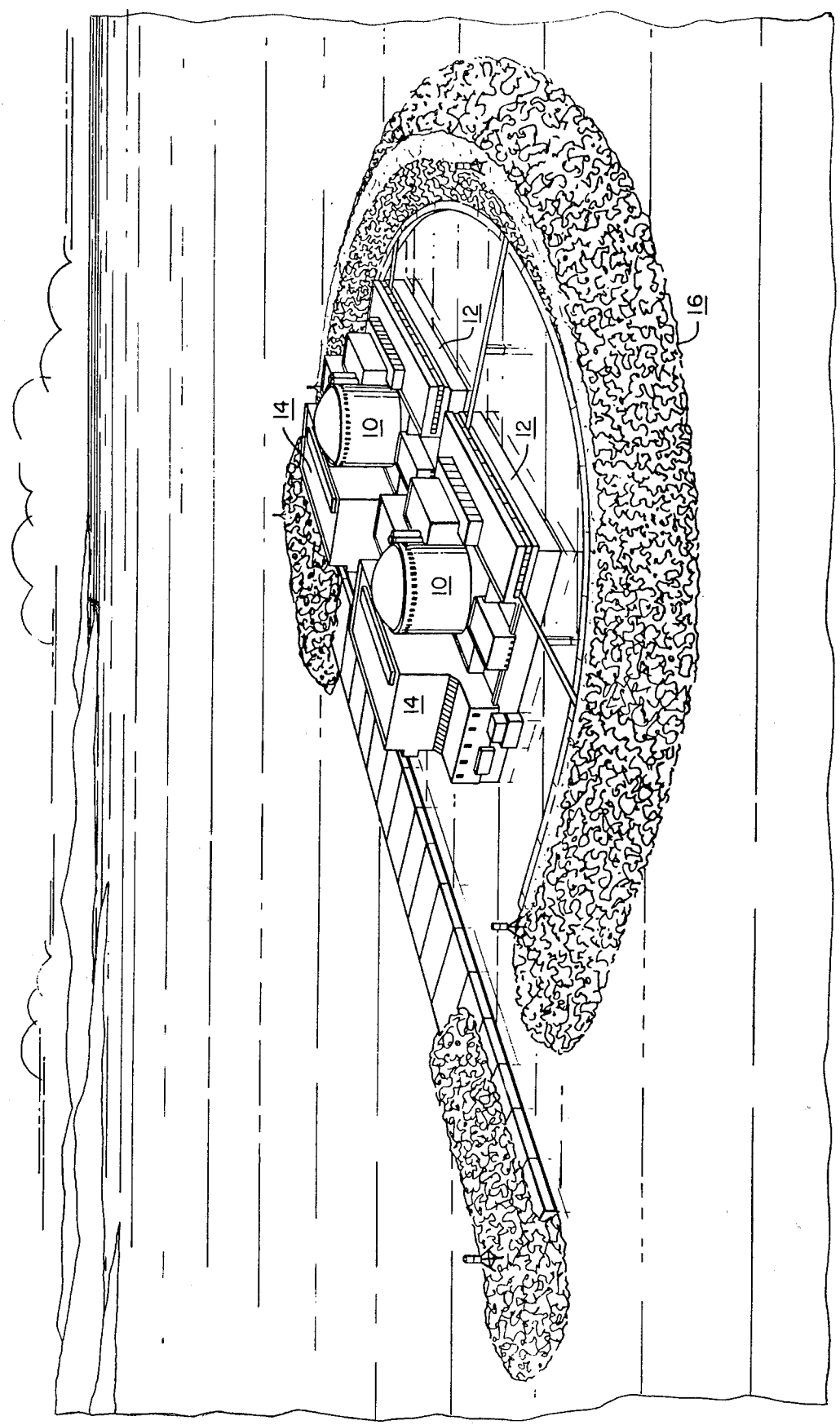
FIG. 1 is a perspective view of a floating nuclear facility employing the invention.

As illustrated in the perspective view shown in FIG. 1, the floating nuclear plant is a totally integrated nuclear power station mounted on a floating platform 12. The power plant is a conventional pressurized water reactor with ice condenser containment 10 and a turbine generator system 14. The perspective view of the facilities shown in FIG. 1 includes two such power plant arrangements secured in mirror image relationship. At the offshore site a breakwater 16 surrounds and protects the plant and forms a basin in which the plants are moored. As pointed out in the aforegoing publication the plant has to be designed to withstand the effects of relative motion of the operating components induced by environmental conditions such as fourfoot waves. In such an arrangement the benefits that can be realized from this invention can be particularly appreciated since the invention permits rigid supports to be employed for the condenser components and either rigid or resilient supports to be employed for the turbine, while minimizing the interactional loads.

Figure 2:
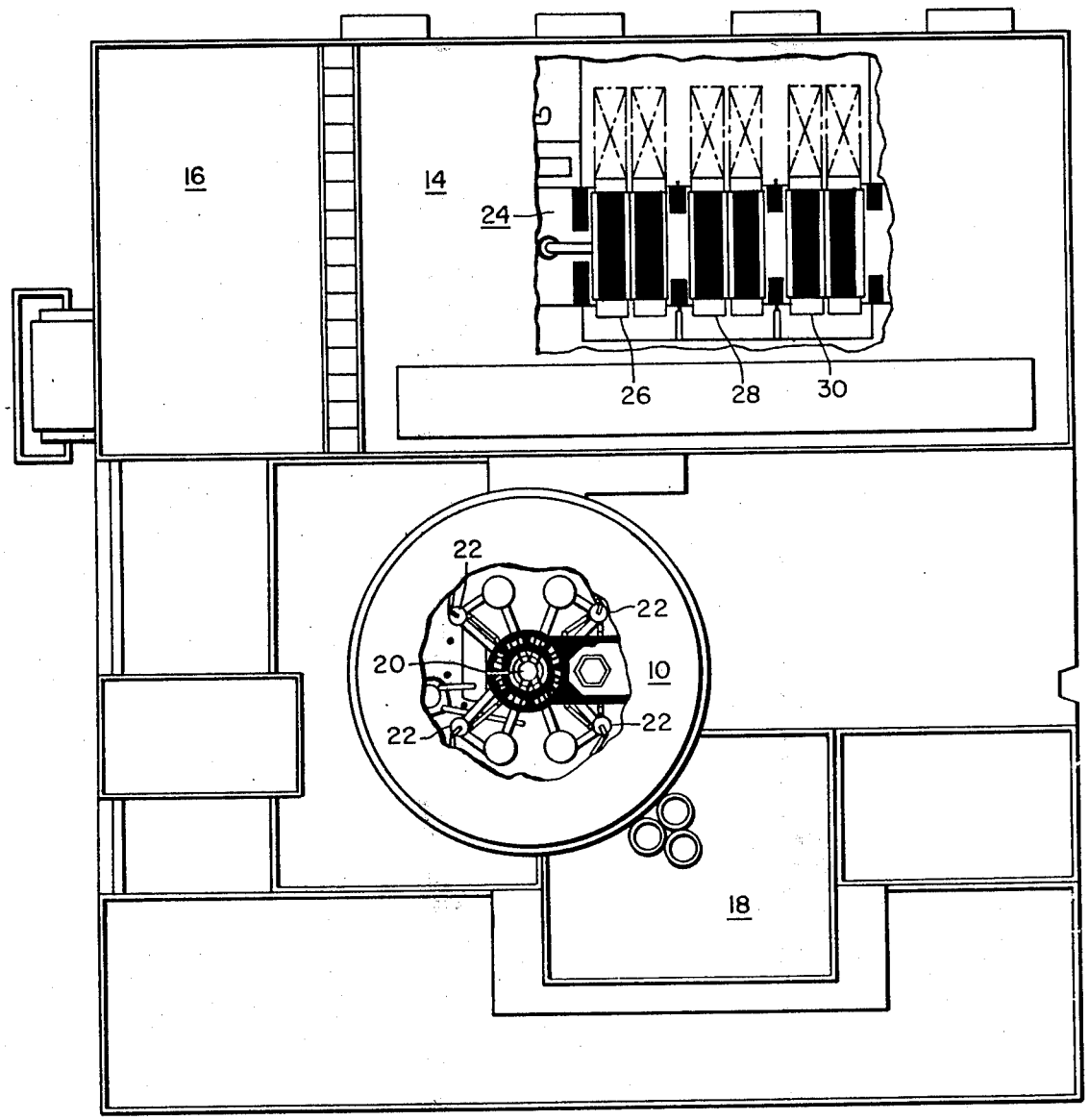
FIG. 2 is a top view of a portion of the nuclear facility illustrated in FIG. 1 with parts cut away to show the general location of the reactor, steam generator, turbine and condenser.

The relative location of the components of the steam turbine system which are particularly pertinent to the invention can better be appreciated in FIG. 2 which shows a top view of one of the barge mounted plants illustrated in FIG. 1, with the pertinent portions cut away for clarity. The layout and general arrangement of an offshore plant is quite similar to conventional land based power plants. However, in a floating plant configuration it is necessary to locate the containment 10, the largest single mass on the barge, somewhat off-center of the platform to compensate for the other major masses, such as the turbine generator 14, the switchyard 16 and their associated foundations and equipment, the spent fuel pit 18 and its shielding, the shielded auxiliary components and the processing and waste treatment systems, and the shielded engineered safeguards equipment. The total arrangement of components is more fully explained in the U.S. Nuclear Regulatory Commission publication, NUREG-75/100, Docket No. STN50-437, Sept. 30, 1975.

To understand the basic operation of the plant, it should be appreciated that the reactor 20 within the containment 10 is employed as a source of heat. The heat is conveyed from the reactor by water circulating through its core to a plurality of steam generators 22 wherein the reactor coolant is placed in heat exchange relationship with feedwater which is used to generate steam. The steam generated in the steam generators is communicated to the turbine building 14.

The turbine building houses the turbine, generator and condensers in a separate physical structure. The turbine itself is better illustrated in the perspective view shown in FIG. 3 and includes a single high pressure turbine 24, three low pressure turbines 26, 28 and 30, and a generator and exciter 32 which are arranged in tandem forming a single shaft.

Figure 3:
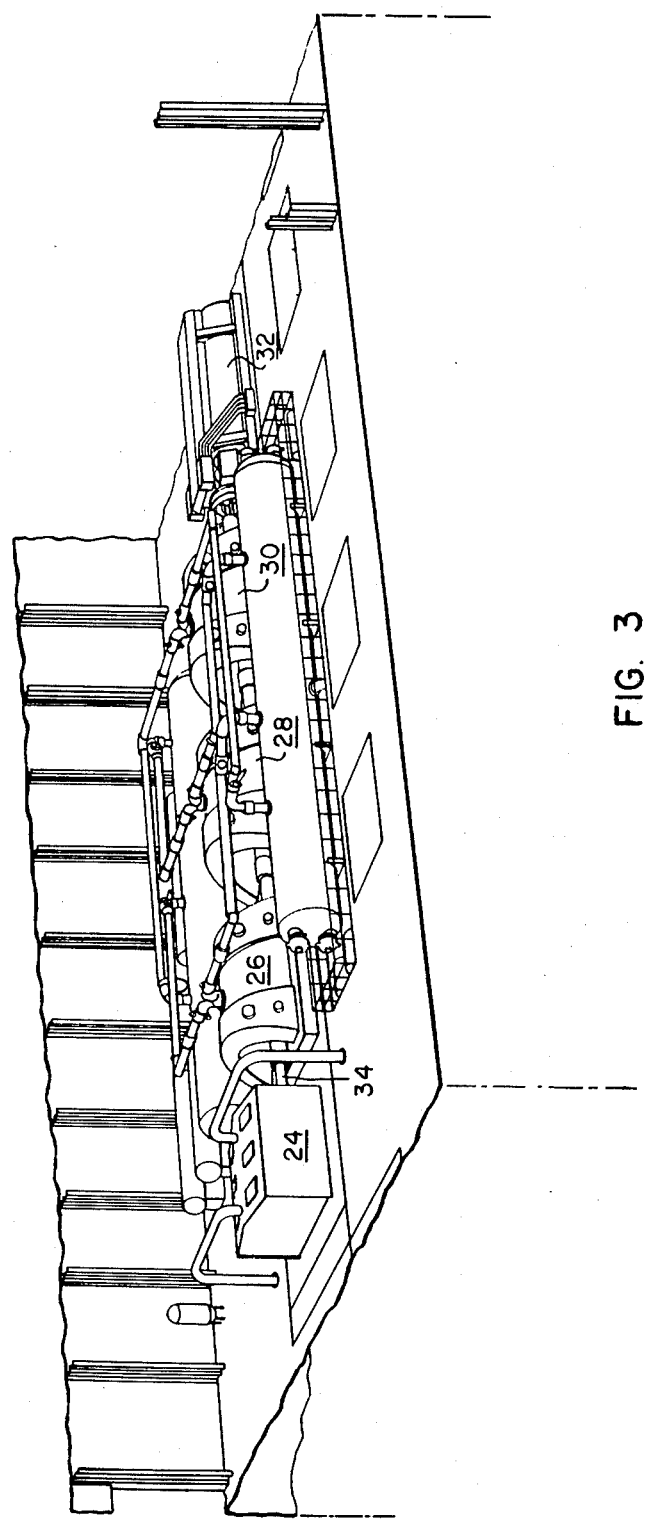
FIG. 3 is a perspective view of the turbine deck of the facility of FIGS. 1 and 2.
Figure 4:
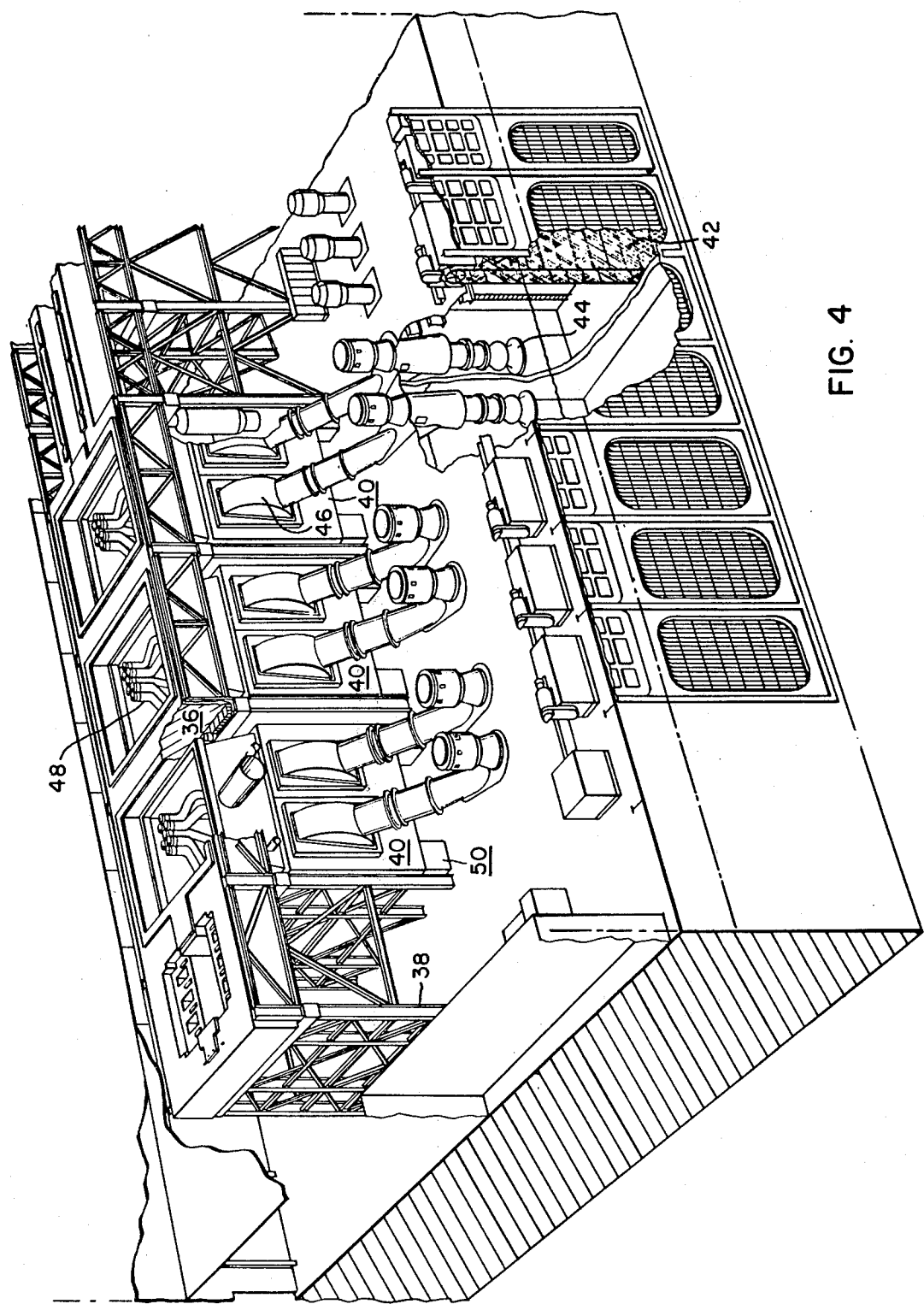
FIG. 4 is a perspective view of the condenser deck of FIGS. 1 and 2.
Figure 5:
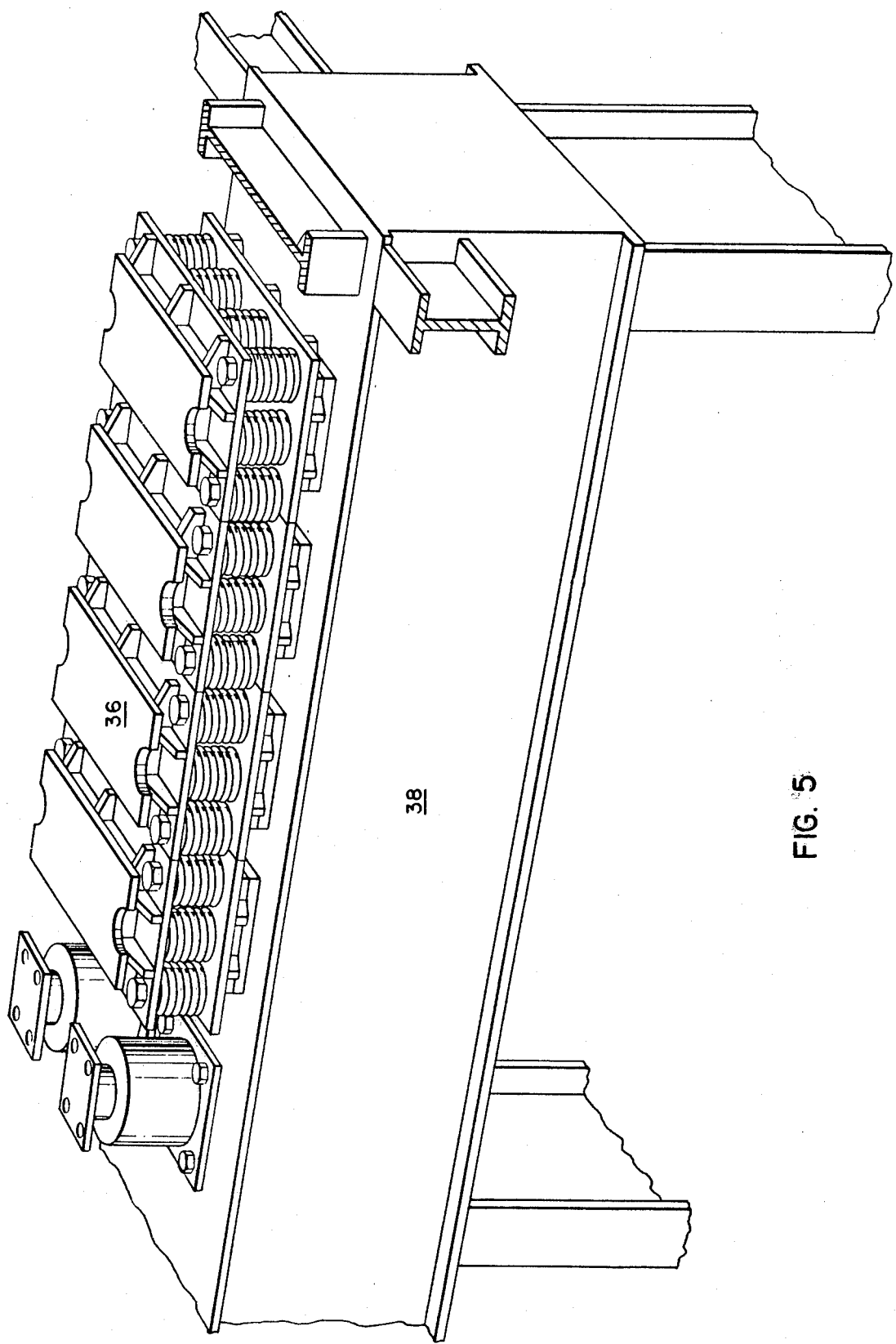
FIG. 5 is a perspective view of a resilient component of the turbine supports employed in FIG. 4 to support the turbine illustrated in FIG. 3.

The turbine shaft centerline 34 is supported independently of the floor framing on a reinforced concrete tabletop supported by helical spring assemblies 36 shown in FIG. 5, which fit above the condensers as illustrated in FIG. 4, and are designed to support the primary equipment of the three low pressure turbines, the high pressure turbine, the steam chest, generator, exciter and miscellaneous piping shown in FIG. 3. The spring assemblies are mounted on a structural steel framework 38 which is best illustrated in FIGS. 4 and 5. The framework forms an integral part of the turbine building structure system which is directly connected to the platform deck of the barge 12. The spring supported foundations form a low tuned turbine support (having a resonant frequency of approximately 4 Hz.) that reduces the dynamic loading of the shaft on the shaft bearings; reduces vibration transmission into the supporting and/or adjacent structures; and adds a realignment capability for the support structure.

The large cylindrical components positioned on either side of the low pressure turbines illustrated in FIG. 3 are employed as combined moisture separator/reheater assemblies.

The low pressure turbines 26, 28 and 30 illustrated in FIG. 3 are mounted on a reinforced concrete table top supported by the spring supports 36 and are directly coupled at their respective turbine exhausts through central openings in the turbine supports to the inlets of corresponding condensers 40 as shown in FIG. 4. The actual coupling between the turbine exhaust and the condenser inlet is accomplished through an expansion joint that enables relative movements induced by thermal expansions and contractions, vibrations and barge motion to be accommodated.

The condensers place the exhaust steam from the turbines in heat exchange relationship with coolant which is drawn from the basin within the breakwater of the barge. The steam condenses within the condensate chambers of the several condensers and is returned to the feedwater system which feeds the steam generators 22. The condenser coolant is drawn from the basin through movable filter screens 42 and pumped through inlets 44 to the coolant intakes 46 of each of the condensers 40. The coolant is passed through a multiple tubing network within the condensate chamber, schematically illustrated by reference character 48, which places the coolant in heat exchange relationship with the steam. Though not shown in FIG. 4, the coolant, once conveyed through the tubing 48, exits the rear portion of the condensers shown in FIG. 4 and is returned to an area outside of the breakwater. The feedwater return lines are not shown in the drawings for convenience. Each of the condensers are rigidly mounted to the support deck by the mounting blocks 50 which secure the condenser arrangements independently of the steam turbine support which is provided through the steel framework 38.

In conventional condenser arrangements during operation the condensation of steam within the condensate chamber will form a vacuum which will exert downward loads on the turbine housing, shaft and supports, which will bow the shaft. In a resiliently mounted turbine arrangement, such as that illustrated in FIG. 4, the relative movement enabled by the resilient supports can accentuate the vacuum load effects. Furthermore, the additional relative motion of the components attributable to the movement of the barge can further add to the forces acting on the turbine.

Suggested solutions of the prior art included rigidly connecting the condenser to the turbine supports and resiliently supporting the condensers from the mounting blocks 50. However, the complexity in design required to address the relative movements associated with this arrangement have been found to be unacceptable. The improvements of this invention illustrated in the embodiments shown in FIGS. 6 through 10 balance the condenser vacuum load on the turbine while maintaining rigid supports for the condenser and independent supports for the turbine.

Figure 6:
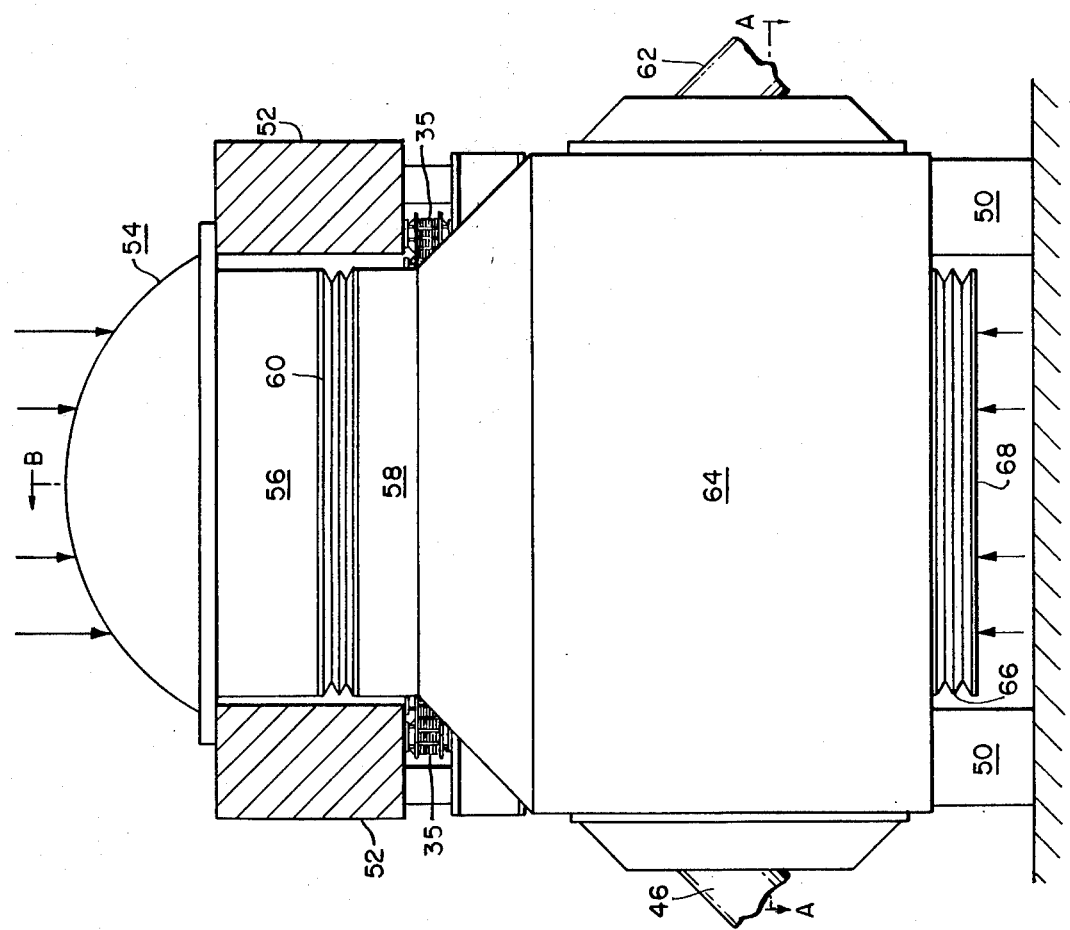
FIG. 6 is a condenser arrangement constructed in accordance with one embodiment of this invention which can be employed in the condenser deck arrangement of FIG. 4.

FIG. 6 shows a perspective view of one embodiment of the invention and illustrates a turbine condenser arrangement having concrete supports 52 formed over the steel framework 38 and the spring supports 36, previously shown in FIGS. 4 and 5, supporting a turbine housing 54 of one of the low pressure turbines 26, 28 or 30 illustrated in FIG. 3. The turbine exhaust 56 is coupled to the inlet of the condenser 58 by an expansion joint 60 which establishes an expandable path between the turbine exhaust and the condensate chamber 64 within the body of the condenser. The condenser coolant inlet pipes 46 and outlet pipes 62 are also shown in this arrangement as well as the rigid mounting blocks 50 which are employed to secure the condenser to the operating deck of the barge facility. The improvement comprises a bellows member 66 and load bearing member 68 which house a vapor chamber which is communicably coupled to the interior of the condensation chamber while being isolated from the condensate. The bellows member functions as an expansion joint and permits the load bearing member 68 to move freely relative to the condenser. The invention operates as will be appreciated hereafter from the description of FIG. 7, to transmit vacuum forces acting upon the load bearing member 68 directly to the turbine housing and its supports in a direction and magnitude opposite and equal to the direction and magnitude of the condenser vacuum load acting directly on the turbine.

Figure 7:
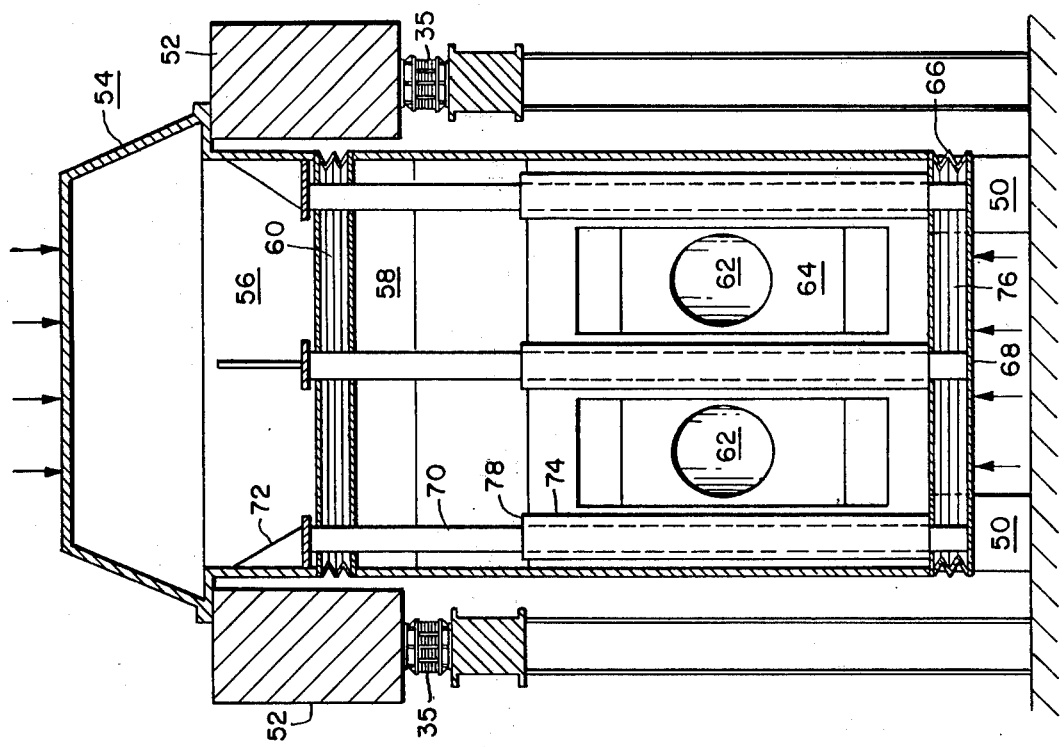
FIG. 7 is a cross-sectional view of the condenser arrangement of FIG. 6 taken along the lines B—B thereof.

FIG. 7 is a cross-section of the embodiment illustrated in FIG. 6 taken along the lines B—B thereof. Like reference characters are employed on the various figures to refer to like portions. As can be better appreciated from the interior portion of the condenser shown in FIG. 7, the vapor chamber 76 is communicably coupled to the interior of the condensate chamber 64 through stand pipes 74 which isolate the condensate from the vapor chamber by maintaining the stand pipe opening 78 significantly above the condensate level. The load bearing member 68 is directly coupled through a force transmitting member (column) 70 and bracket assembly 72 to the turbine housing 54 and supports 52 to communicate the forces acting on the load bearing member directly to the turbine housing. The stand pipes 74 function to prevent the liquid condensate from contributing to the forces being transmitted to the turbine support which might otherwise unbalance the vacuum load acting on the turbine support. Accordingly, the vacuum load on the turbine communicated from the condensate chamber is balanced by an equal and opposite load acting on the load bearing member 68 which is transmitted through the column 70 and bracketing 72 to the turbine. Desirably, the load bearing member surface area is sized to equal the cross-sectional opening area of the condenser inlet 58 and is arranged in a parallel plane to the condenser inlet opening. As can better be appreciated from FIG. 8, which shows a top cross-sectional view of the embodiment of FIG. 6, the load bearing member 68 is coupled through multiple columns 70 to the turbine housing, with each column running concentrically within an outer stand pipe 74 positioned peripherally around and among the condenser cooling coils which are not shown for convenience.

Since the chamber formed by the bellows 66, the load bearing member 68 and the condenser floor is a vapor chamber, some relatively minor condensation will occur both during steady state and transient conditions. Therefore, means are provided (i.e., a drain valve), though not shown, to remove this condensate.

Figure 9:
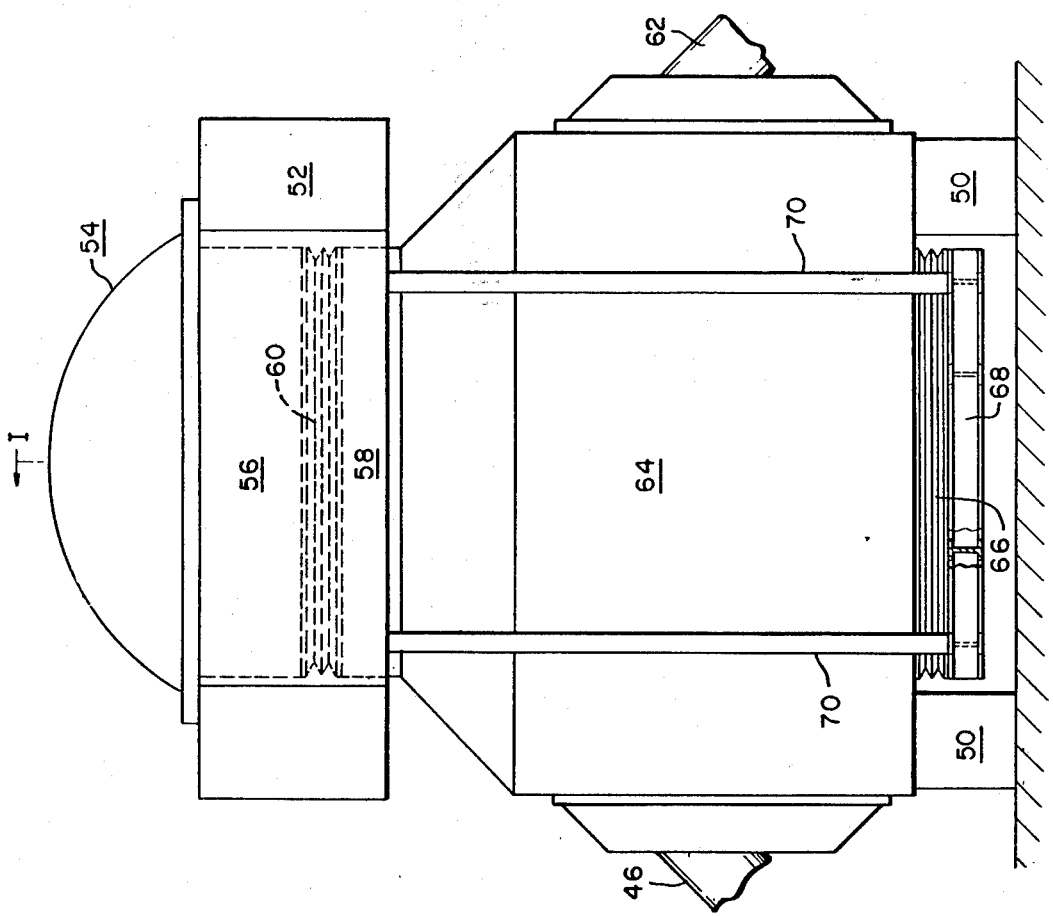
FIG. 9 is a condenser arrangement incorporating a second embodiment of this invention.

FIG. 9 illustrates a modified embodiment wherein the force transmitting columns 70 between the turbine supports 52 and the load bearing member 68 is situated exterior of the condenser housing, but in function the modified embodiment illustrated in FIG. 9 is identical to that illustrated in FIG. 6. Advantages and disadvantages of the two embodiments will be determined by the application and will depend upon the ease of fabrication of the arrangement as well as the area available for exterior struts within an operating facility.

Figure 10:
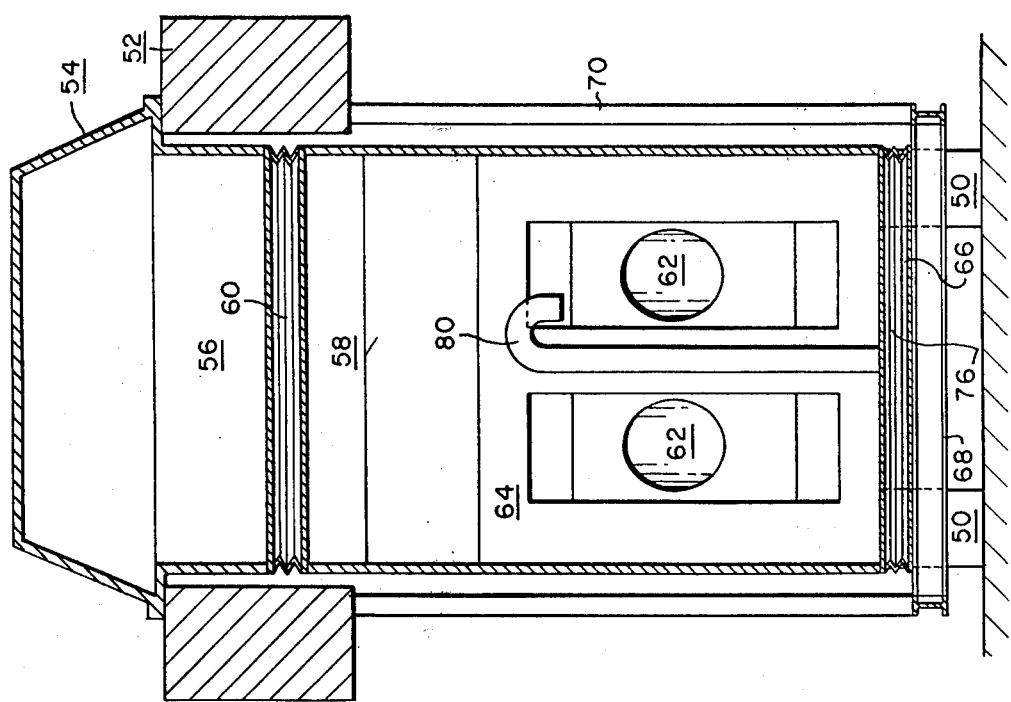
FIG. 10 is a cross-sectional view of the condenser arrangement of FIG. 9 taken along the lines A—A thereof.

FIG. 10 is a cross-sectional view of FIG. 9 taken along lines I—I thereof, which shows that a stand pipe 80 is still required to establish communication between the interior of the vapor chamber 76 and the condensate chamber without communicating the condensate. The remaining structure is identical to that shown in FIG. 7, except it should be appreciated that less internal tubing is required in the embodiment of FIGS. 9 and 10, which minimizes problems which might otherwise be encountered in positioning the condenser cooling conduits.

Thus it can be appreciated that this invention minimizes the loads normally exerted on turbine supports through the turbine casings due to the difference in external and internal pressures acting on the turbine-condenser system; and minimizes residual plant motion loads and moments on the turbine, and therefore on its support, which would occur if the condenser were mounted on springs and solidly connected to the turbine—thus avoiding excessive stresses on operating equipment which can result in costly shutdowns.

I claim:
1. A condenser for eliminating the vacuum load on a steam turbine support arising from the condensation of the turbine exhaust steam, comprising:
   a condenser steam inlet;
   an expandable coupling hermetically connected to the condenser steam inlet at one end adapted to communicably couple the turbine exhaust and condenser steam inlet through an expandable path;
   a condensation chamber communicably coupled to the steam inlet;
   means for condensing steam within the condensation chamber;
   means for rigidly supporting the condenser;
   a load bearing member having at least a portion of a surface thereof hermetically communicating with the interior of the condensation chamber;
   means for transmitting to the turbine forces acting on the load bearing member due to the vacuum generated from the condensation of steam within the condensation chamber, to a degree equal and in a direction opposite to the forces acting directly on the turbine from the vacuum load communicated from the condensation chamber;

means for substantially preventing the condensed steam from exerting a load on the load bearing member.

2. The condenser of claim 1 wherein the prevention means comprises a separate chamber formed in part by the load bearing member coupled through a connector to the condensation chamber, the second chamber being physically isolated from the condensed steam while maintaining gas communication with the interior of the condensation chamber.

3. The condenser of claim 2 wherein the connector includes an expansion coupling.

4. The condenser of claim 2 wherein the communication between the separate chamber and the condensation chamber is established through a stand pipe extending from the separate chamber through the condensation chamber above the condensed steam.

5. The condenser of claim 4 wherein the force transmitting means includes a connecting member positioned within and extending through the stand pipe and rigidly coupling the load bearing member to the turbine.

6. The condenser of claim 5 wherein the connecting member is longitudinally movable within the stand pipe.

* * * * *